United States Patent
Takeuchi et al.

(10) Patent No.: US 9,549,507 B2
(45) Date of Patent: *Jan. 24, 2017

(54) METHOD FOR CULTIVATING PLANT

(71) Applicant: SHOWA DENKO K.K., Minato-ku, Tokyo (JP)

(72) Inventors: Ryouichi Takeuchi, Tokyo (JP); Hironori Ara, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 276 days.

This patent is subject to a terminal disclaimer.

(21) Appl. No.: 14/171,222

(22) Filed: Feb. 3, 2014

(65) Prior Publication Data

US 2014/0215918 A1 Aug. 7, 2014

(30) Foreign Application Priority Data

Feb. 4, 2013 (JP) ................................. 2013-019721

(51) Int. Cl.
A01G 7/04 (2006.01)

(52) U.S. Cl.
CPC .............. A01G 7/045 (2013.01); *Y02P 60/149* (2015.11)

(58) Field of Classification Search
CPC ................................. A01G 7/04; A01G 7/045
USPC ................................................... 47/58.1 LS
See application file for complete search history.

(56) References Cited

U.S. PATENT DOCUMENTS

| | | | | |
|---|---|---|---|---|
| 3,930,335 A | * | 1/1976 | Widmayer | A01G 7/045 47/58.1 R |
| 4,724,633 A | * | 2/1988 | Kadkade | A01G 7/045 47/58.1 R |
| 2007/0151149 A1 | * | 7/2007 | Karpinski | A01G 7/045 47/58.1 LS |
| 2009/0190363 A1 | * | 7/2009 | Mcdonnell | A01G 7/045 362/396 |
| 2012/0124903 A1 | | 5/2012 | Takeuchi | |
| 2012/0218750 A1 | | 8/2012 | Klase et al. | |
| 2013/0264934 A1 | * | 10/2013 | Osaki | A01G 7/045 313/46 |

FOREIGN PATENT DOCUMENTS

JP 06-276858 A 10/1994
JP 8-103167 A 4/1996
(Continued)

OTHER PUBLICATIONS

Rakleviciene et al., "Effects of Illumination on the Growth and Histogeny of Garden Cress Seedlings under Altered Gravity." Biologija. 2007, vol. 53 No. 2 p. 55-58.*
(Continued)

*Primary Examiner* — Monica Williams
*Assistant Examiner* — Magdalena Topolski
(74) *Attorney, Agent, or Firm* — Sughrue Mion, PLLC

(57) ABSTRACT

A plant-cultivating method is provided which comprises a step (A) of irradiating a plant with a red light and a step (B) of irradiating a plant with a blue light, and a step (C) of irradiating a plant with a light predominantly comprised of far-red light wherein the step (A), the step (B) and the step (C) are independently and separately carried out for a predetermined period of time. The light irradiated at each of the steps (A), (B) and (C) has at least 60%, based on the total emission intensity of the light, of an emission intensity ratio of red light, blue light or far-red light.

8 Claims, 1 Drawing Sheet

(56) References Cited

FOREIGN PATENT DOCUMENTS

| | | | |
|---|---|---|---|
| JP | 2005-151850 A | | 6/2005 |
| JP | 2006-67948 A | | 3/2006 |
| JP | 2008-142005 A | | 6/2008 |
| JP | 2012-157331 A | | 8/2012 |
| JP | 2012-165665 A | | 9/2012 |
| JP | 2012-179009 A | | 9/2012 |
| WO | 2011/016521 A1 | | 2/2011 |
| WO | 2011/033177 A2 | | 3/2011 |
| WO | WO2012/070435 | * | 5/2012 |
| WO | WO2013/027198 | * | 2/2013 |

OTHER PUBLICATIONS

Japanese Office Action dated Oct. 7, 2014, issued in corresponding application No. 2013-019721.
European Search Report dated Jun. 18, 2014 issued in corresponding application No. 14153603.7-1656.
Communication dated Jun. 18, 2014 from the European Patent Office in counterpart application No. 14153606.0.
Communication dated Oct. 7, 2014 from the Japanese Patent Office in counterpart application No. 2013-019719.
Communication dated Oct. 21, 2015 from the U.S. Patent and Trademark Office in counterpart U.S. Appl. No. 14/171,066.
Communication dated Mar. 24, 2016 from the U.S. Patent and Trademark Office in counterpart U.S. Appl. No. 14/171,066.
Communication dated Aug. 4, 2016 from the U.S. Patent and Trademark Office in counterpart U.S. Appl. No. 14/171,066.

* cited by examiner

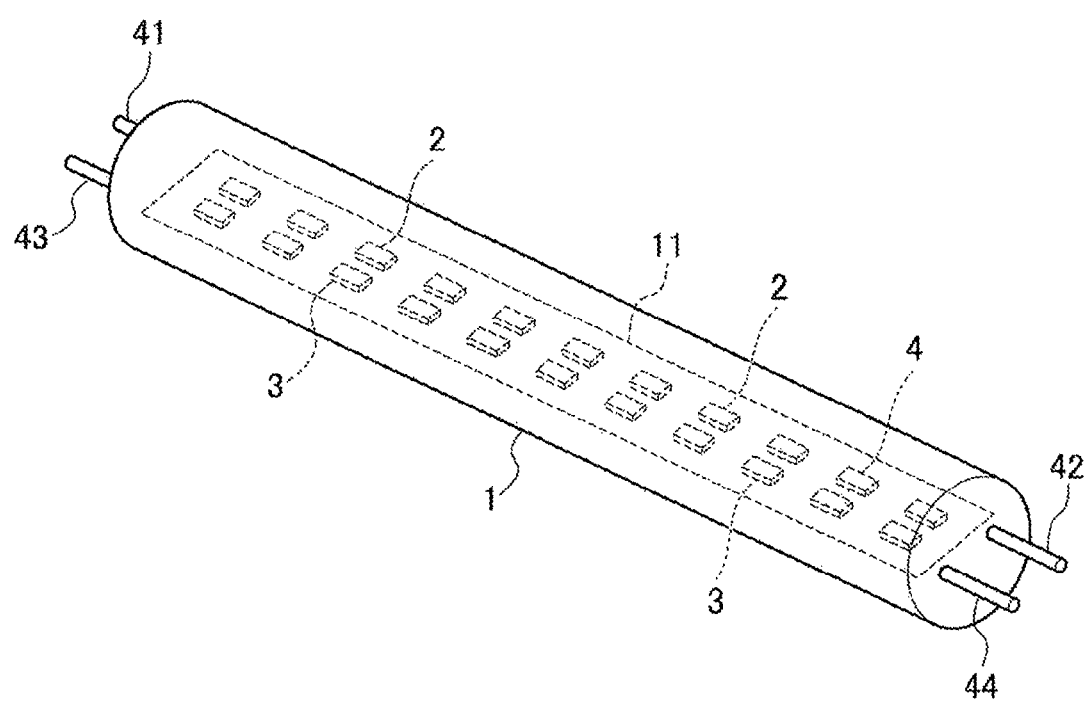

METHOD FOR CULTIVATING PLANT

BACKGROUND OF THE INVENTION (1) Field of the Invention

This invention relates to a method for cultivating a plant. More particularly it relates to a method for cultivating a plant while the plant is irradiated with an artificial light using a light-emitting lamp for plant cultivation whereby growth of the plant is promoted.

(2) Description of Related Art

Light-emitting technology has heretofore been adopted for growing seedlings or promoting growth of plants whereby a cultivation period of plants can be shortened and frequency of harvesting in the same farm can be increased. Plants can be grown to a large size within a predetermined period of time, and the crop yield can be enhanced.

As a plant cultivation technique utilizing artificial light irradiation, an illumination lamp facility for irradiating a plant alternately with green light and white light has been proposed, for example, in patent document 1. In this illumination lamp facility, plants are irradiated alternately with green light having a wavelength of 500 to 570 nm and white light having a wavelength of 300 to 800 nm whereby simulated day and night are created. Consequently the sugar translocation within plant bodies is smoothly effected and growth of plants is enhanced.

Another proposal has been proposed in patent document 2, which comprises an illumination lamp facility equipped with a light emitting diode (LED) for irradiating plants alternately or concurrently with blue light having a wavelength of 400-480 nm and red light having a wavelength of 620-700 nm to supply light energy for cultivation, growth, and tissue cultivation of plants. This illumination lamp facility is characterized as irradiating plants selectively with light having a wavelength corresponding to the light absorption peak of chlorophyll, i.e., in the vicinity of 450 nm and the vicinity of 660 nm whereby the plants are cultivated with an enhanced energy efficiency.

It is stipulated in patent document 2 that blue light and red light may be irradiated either concurrently or alternately (see patent document 2, claim 1). More specifically it is described in this patent document that single radiation of blue light, single radiation of red light and concurrent radiation of blue light and red light are compared with each other, and it was verified that the concurrent radiation of blue light and red light exhibited an enhanced effect on healthy growth of plants, which is similar to the growth achieved by sun light radiation, whereas the single radiation of blue light or red light brings about unhealthy growth such as spindly growth of plants (see patent document 2, paragraph [0011]). It is further described in patent document 2 that blue light and red light are alternately radiated by blinking by means of a blinking pattern at a high frequency of several megahertz or more (see patent document 2, paragraph [0006]).

However, patent document 2 is silent on a method of alternately conducting a blue light irradiation step and a red light irradiation step, and thus, growth promoting effects achieved by the alternate light irradiation method are not verified.

PRIOR ART DOCUMENTS

Patent documents

Patent document 1: JP 1994-276858A
Patent document 2: JP 1996-103167A

To enhance the productivity in plant cultivation, a plant cultivation method utilizing artificial light irradiation, which is simple and easy, and exhibits enhanced energy efficiency and excellent growth promotion effect, is eagerly desired.

A primary object of the present invention is to provide an improved method of cultivating a plant using an artificial light-irradiating facility, whereby a plant growth promotion effect can be greatly enhanced.

BRIEF SUMMARY OF THE INVENTION

The present inventors made extensive research for providing an improved method for cultivating a plant using an artificial light-irradiating lamp facility with enhanced growth promotion effect, and have found that an enhanced growth promotion effect is achieved by a plant-cultivation method comprising a step (A) of irradiating a plant with a red light and a step (B) of irradiating the plant with a blue light, wherein the two steps (A) and (B) are independently carried out for a predetermined period of time, and further found that the growth promotion effect can be enhanced by varying the light irradiation conditions.

Thus, an excellent growth promotion effect has been obtained by carrying out a step (C) of irradiating a plant with a light predominantly comprised of a far red-light, separately from the red light irradiation step (A) and the blue light irradiation step (B). Based on these findings, the present invention has been completed.

In accordance with the present invention, there are provided the following plant-cultivating methods.

(1). A method of cultivating a plant comprising a step (A) of irradiating a plant with a red light and a step (B) of irradiating a plant with a blue light, wherein the red light irradiation step (A) and the blue light irradiation step (B) are independently carried out for a predetermined period of time, and wherein said method of plant-cultivation further comprises a step (C) of irradiating a plant with a light predominantly comprised of a far-red light, separately from the red light irradiation step (A) and the blue light irradiation step (B).

(2). The method of cultivating a plant as mentioned above in (1), wherein, the light irradiated at the far-red light irradiation step (C) has at least 60%, based on the total emission intensity of the light, of an emission intensity ratio of far-red light.

(3). The method of cultivating a plant as mentioned above in (1), wherein the light irradiated at the red light irradiation step (A) has at least 60%, based on the total emission intensity of said light irradiated at the step (A), of an emission intensity ratio of red light.

(4). The method of cultivating a plant as mentioned above in (1), wherein the light irradiated at the blue light irradiation step (B) has at least 60%, based on the total emission intensity of said light irradiated at the step (B), of an emission intensity ratio of blue light.

(5). The method of cultivating a plant as mentioned above in (1), wherein the far-red light has a center wavelength in the range of 720 nm to 780 nm, the red light has a center wavelength in the range of 620 nm to 700 nm, and the blue light has a center wavelength in the range of 400 nm to 480 nm.

(6). The method of cultivating a plant as mentioned above in (1), wherein the red light is irradiated by using a semiconductor light emitting element having an AlGaInP light emitting layer, the blue light is irradiated by using a semiconductor light emitting element having a GaInN light emitting layer, and the far-red light is irradiated by using a semiconductor light emitting element having an AlGaAs light emitting layer.

(7). The method of cultivating a plant as mentioned above in (1), wherein the red light irradiation step (A), the blue light irradiation step (B) and the far-red light irradiation step (C) are alternately and repeatedly carried out over a period of at least one hour for each irradiation time.

(8). The method of cultivating a plant as mentioned above in (1), wherein the red light irradiation step (A), the blue light irradiation step (B) and the far-red light irradiation step (C) are carried out using an illumination lamp facility having red light emitting elements, blue light emitting elements and far-red light emitting elements, which are capable of being independently operated, and wherein a ratio of the total emission intensity of red light to the total emission intensity of blue light is in the range of 1:1 to 9:1, and a ratio of the total emission intensity of blue light to the total emission intensity of far-red light is in the range of 1:1 to 9:1.

By the term "plant(s)" as used in this specification, we mean plants in a broad sense which include leaf plants, fruit plants, grains and algae. The plant cultivation method according to the present invention exhibits especially marked growth promotion effect for phytoplankton such as algae, and mosses and euglena.

Effect of the Invention

Plant growth promotion effect can be greatly enhanced by independently carrying out the red light irradiation step (A) and the blue light irradiation step (B), and further by carrying out a step (C) of irradiating with a light predominantly comprised of a far-red light, separately from the red light irradiation step (A) and the blue light irradiation step (B).

It is presumed that the photosynthesis reactions by irradiation of red light and irradiation of blue light irradiation can be most effectively performed by the irradiation of far-red light having a function of activating phytochrome A, and consequently the growth promotion effect is more enhanced.

BRIEF DESCRIPTION OF THE DRAWINGS

FIG. 1 is a perspective view of an example of an illumination lamp having red light emitting elements and blue light emitting elements as used in the plant-cultivation method of the present invention.

DETAILED DESCRIPTION OF THE INVENTION

Preferred modes for practicing the invention will be described with reference to the accompanying drawings. The described modes by no means limit the scope of the invention.

It is known that chlorophyll contained in plants exhibits two different peaks in the vicinities 450 nm (blue color) and 660 nm (red color) on the light absorption curve. It is also known that chlorophyll further exhibits a peak in the vicinity of 740 nm (far-red color) and further that this absorption is closely related to morphogenesis of plants.

The present inventors have investigated the photosynthesis reaction and related reactions caused by irradiation of red light, blue light and far-red light, and found that these reactions interfere with each other and inhibiting factors therefor exist. It has been found that separate irradiation of red light, blue light and far-red light is effective for growth promotion of plants, more specifically, the reaction process occurring due to far-red light irradiation does not interfere with the reaction processes occurring due to red light irradiation and blue light irradiation, and the separate irradiation of red light, blue light and far-red light in a plant cultivation method exhibits growth promotion effect. Especially the irradiation of far-red light has been found to exhibit beneficial effect for morphogenesis of plants.

The plant cultivation method of the present invention is characterized by comprising a step (A) of irradiating the plant with a red light (which step (A) is hereinafter referred to as "red light irradiation step (A)" or "step (A)" for brevity) and a step (B) of irradiating the plant with a blue light (which step (B) is hereinafter referred to as "blue light irradiation step (B)" or "step (B)" for brevity), wherein the red light irradiation step (A) and the blue light irradiation step (B) are independently carried out for a predetermined period of time, and wherein said method of plant-cultivation further comprises a step (C) of irradiating a plant with a light predominantly comprised of a far-red light (which step (C) is hereinafter referred to as "far-red light irradiation step (C)" or "step (C)" for brevity), separately from the red light irradiation step (A) and the blue light irradiation step (B).

In the plant cultivation method of the present invention, the order of carrying out the red light irradiation step (A), the blue light irradiation step (B) and the far-red light irradiation step (C) is not particularly limited.

By separately carrying out these steps (A), (B) and (C), the beneficial effects of activating phytochrome A and presentation of dark reaction, which occur due to the irradiation of far-red light, can be achieved.

In the plant cultivation method of the present invention, the light irradiated at the far-red light irradiation step (C) is predominantly comprised of a far-red light. Preferably, the light irradiated at the step (C) has at least 60%, based on the total emission intensity of the light, of an emission intensity ratio of far-red light.

Thus, the light irradiated at the step (C) may contain lights other than far-red light, which include, for example, visible light such as blue light, green light, purple light and yellow and/or red light, ultraviolet ray, and infrared ray. In the case when the light irradiated at the step (C) contains these lights other than far-red light in an amount of not more than 40%, as expressed by a ratio of the emission intensity thereof to the total emission intensity of the light irradiated at the step (C), the desired plant growth promotion effect can be achieved. The amount of the lights other than far-red light is more preferably not more than 20%, and most preferably zero. The light irradiated at the step (C) maybe comprised of, for example, 60% of far-red light, 20% of green light and 20% of blue light, based on the total emission intensity of the light irradiated at the step (C).

As luminous bodies used in the plant-cultivation method, those which have a small half-value width of emission spectrum are preferably used because color mixing can be minimized or rendered zero. Such luminous bodies include, for example, lasers and light emitting diodes. In view of emission efficiency and cost, light emitting diodes are most preferably used. More specifically, the red light is irradiated by using a semiconductor light emitting element having an AlGaInP light emitting layer, the blue light is irradiated by using a semiconductor light emitting element having a GaInN light emitting layer, and the far-red light is irradiated by using a semiconductor light emitting element having an AlGaAs light emitting layer.

The light irradiated at the red light irradiation step (A) is not particularly limited provided that the light irradiated at the step (A) is predominantly comprised of red light. Preferably, the light irradiated at the step (A) has at least 60%, based on the total emission intensity of the light, of an emission intensity ratio of red light.

Thus, the light irradiated at the step (A) may contain lights other than red light, which include, for example, visible light such as blue light and green light. In the case when the light irradiated at the step (A) contains these lights other than red light in an amount of not more than 30%, as expressed by a ratio of the emission intensity thereof to the total emission intensity of the light irradiated at the step (A), the desired plant growth promotion effect can be achieved. The amount of the lights other than red light is more preferably not more than 20%, and most preferably zero. The light irradiated at the step (A) may be comprised of, for example, 60% of red light, 20% of green light and 20% of blue light, based on the total emission intensity of the light irradiated at the step (A). Most preferable light irradiated at the step (A) is comprised of 100% of red light.

The light irradiated at the blue light irradiation step (B) is not particularly limited provided that the light irradiated at the step (B) is predominantly comprised of blue light. Preferably, the light irradiated at the step (B) has at least 60%, based on the total emission intensity of the light, of an emission intensity ratio of blue light.

Thus, the light irradiated at the step (B) may contain lights other than blue light, which include, for example, visible light such as red light and green light. In the case when the light irradiated at the step (B) contains these lights other than blue light in an amount of not more than 30%, as expressed by a ratio of the emission intensity thereof to the total emission intensity of the light irradiated at the step (B), the desired plant growth promotion effect can be achieved. The amount of the lights other than blue light is more preferably not more than 20%, and most preferably zero. The light irradiated at the step (B) may be comprised of, for example, 60% of blue light, 20% of green light and 20% of red light, based on the total emission intensity of the light irradiated at the step (B). Most preferable light irradiated at the step (B) is comprised of 100% of blue light.

By the term "light emission intensity" or "emission intensity" as used in the specification, we mean those which are expressed by photosynthetic photon flux density (PPFD; in $\mu mol/m^2 s$).

The red light as used in the cultivation method of the present invention has a center wavelength in the range of 620 nm to 700 nm, the blue light has a center wavelength in the range of 400 nm to 480 nm, and the far-red light has a center wavelength in the range of 720 nm to 780 nm.

Illumination Lamp for Plant Cultivation

In the plant-cultivation method of the present invention, an illumination lamp facility for plant cultivation having red light emitting elements and blue light emitting elements, both of which are capable of being independently operated, is used for independently (preferably, alternately and repeatedly) carrying out the red light irradiation step (A) and the blue light irradiation step (B) for a predetermined period of time.

The illumination lamp facility as used in the plant-cultivation method of the present invention further has far-red light emitting elements capable of being preferably independently operated for independently (preferably, alternately and repeatedly) carrying out the far-red light irradiation step (C), separately from the red light irradiation step (A) and the blue light irradiation step (B).

FIG. 1 is a perspective view of a preferable example of an illumination lamp for plant cultivation which has red light emitting elements 2, blue light emitting elements 3 and far-red light emitting elements 4. This illumination lamp 1 has a light irradiation part 11 having a rectangular shape in the planar view, and further has a control part (not shown) for controlling the light irradiation part 11.

An excellent plant-cultivation promotion effect can be attained by the provision of the red light emitting elements 2, the blue light emitting elements 3 and the far-red light emitting elements 4, which are capable of being independently operated for independently carrying out the far-red light irradiation step (C), separately from the red light irradiation step (A) and the blue light irradiation step (B).

As specific operations of the illumination lamp 1, red light irradiation, blue light irradiation and far-red light irradiation can be concurrently or separately, or repeatedly, irradiated, and the time period of each irradiation can be varied, depending upon the kinds of plants.

As illustrated in FIG. 1, the light irradiation part 11 is provided with plural red light emitting elements 2, plural blue light emitting elements 3 and plural far-red light emitting elements 4. The light emitting elements 2, 3 and 4 exhibit approximately the same emission efficiency. In the plant cultivation lamp 1, as specifically illustrated in FIG. 1, the ratio in number of red light emitting elements 2, blue light emitting elements 3 and far-red light emitting elements 4 is 6:3:1.

Plural red light emitting elements 2, plural blue light emitting elements 3 and plural far-red light emitting elements 4 are arranged with equal intervals along straight lines (two straight lines in FIG. 1) extending in the length direction of the light irradiation part 11. The straight lines are substantially parallel to each other.

A ratio in number of red light emitting elements 2, blue light emitting elements 3 and far-red light emitting elements 4 in the plant cultivation lamp 1 can be varied appropriately depending upon the desired light emission intensities, and the numbers of the three kinds of light emitting elements may be the same or different, although the ratio in number of red light emitting elements 2, blue light emitting elements 3 and far-red light emitting elements 4 in the lamp 1 illustrated in FIG. 1 is 6:3:1.

The rate of plant growth sometimes varies depending upon the light emission intensity ratio of red light to blue light. For example, some plants exhibit enhanced rate of growth when the red light emission intensity is larger than the blue light emission intensity. For these plants, it is preferable to use a plant cultivating illumination lamp 1 having a light emitting part provided with a larger number of red light emitting elements 2 than blue light emitting elements 3. By using the lamp 1 provided with a larger number of red light emitting elements 2 than blue light emitting elements 3, the light emission intensity of red light can be easily made larger than that of blue light.

It is preferable that the numbers of red light emitting elements 2, blue light emitting elements 3 and far-red light emitting elements 4 in the illumination lamp 1 are substantially proportional to the emission intensities of the three lights to be applied to the plants.

For many plants, the magnitude of total emission intensity of red light, the magnitude of total emission intensity of blue light and the magnitude of total emission intensity of far-red light is preferably in the order of red light blue light far-red light. It is further preferable that a ratio of the total emission intensity of red light to the total emission intensity of blue light is in the range of 1:1 to 9:1, and a ratio of the total emission intensity of blue light to the total emission intensity of far-red light is in the range of 1:1 to 9:1.

By using a plant-cultivation illumination lamp 1 having a light irradiation part 11 having red light emitting elements 2, blue light emitting elements 3 and far-red light emitting elements 4 which can exhibit the above-mentioned emission intensity ratios of red light, blue light and far-red light, when appropriate amounts of currents are applied to the respective light emitting elements, the desired emission intensity ratios of the three lights can be manifested.

The illumination lamp 1 is preferably such that an applied electrical current can be exactly adjusted and the ratios of emission intensities of the three kinds of lights can be easily and desirably varied depending upon the particular plants by precisely adjusting the amount of electrical current.

If the emission intensity ratio of blue light or red light to far-red light is smaller than the above-mentioned range, i.e., the relative emission intensity of far-red light is too large, the desired plant growth promotion effect is often difficult or even impossible to attain. Similarly, if the emission intensity ratio of blue light to far-red light is larger than the above-mentioned range, i.e., the relative emission intensity of blue light is too large, the desired plant growth promotion effect is also often difficult or even impossible to attain.

The light irradiation part of the illumination lamp facility as used in the present invention preferably has a mixed light emitting package such that red light emitting elements, blue light emitting elements and far-red light emitting elements are arranged in a single light emitting package. The mixed light emitting package preferably has a function such that the emission intensity of red light emitting elements, the emission intensity of blue light emitting elements and the emission intensity of far-red light are capable of being independently controlled.

The ratio of the total emission intensity of red light emitting elements to the total emission intensity of blue light emitting elements in the mixed light emitting package is preferably at least 1:1, more preferably in the range of 2:1 to 9:1, and especially preferably in the range of 2:1 to 5:1. The total emission intensity of far-red light emitting elements is preferably approximately the same as or smaller than the total emission intensity of red light emitting elements or approximately the same as or smaller than the total emission intensity of blue light emitting elements in the mixed light emitting package.

Conventional light emitting elements can be used as the red light emitting elements 2, the blue light emitting elements 3, and the far-red light emitting elemnts. For example, light emitting diode (LED) in which the desired wavelength can be easily selected and light energy within the effective wavelength region occupies a predominant part can be beneficially used. Laser diode (LD) and an electroluminescent (EL) element can also be used. The EL element used may be either an organic EL element or inorganic EL element. Light emitting diode is most preferable because of low cost and high emission efficiency.

Red light emitted from the red light emitting elements 2 preferably has a center emission wavelength within the range of 620 nm to 700 nm, more preferably within the range of 645 nm to 680. Blue light emitted from the blue light emitting elements 3 preferably has a center emission wavelength within the range of 400 nm to 480 nm.

Each of the red light and the blue light preferably has a wavelength region in the range of the center emission wavelength ±30 nm, more preferably in the range of the center emission wavelength ±20 nm, and especially preferably in the range of the center emission wavelength ±10 nm.

Far-red light emitted from the far-red light emitting elements 4 preferably has a center emission wavelength within the range of 710 nm to 800 nm, especially preferably within the range of 720 nm to 780 nm.

The emission intensities of red light, blue light and far-red light which emit from the light irradiation part 11 are not particularly limited, but each emission intensity is preferably in the range of 1 to 1,000 μmol/m²s, more preferably 10 to 500 μmol/m²s, and especially preferably 30 to 300 μmol/m²s, as expressed by photosynthetic photon flux density (PPFD). The emission intensity ratios of red light, blue light and far-red light are preferably in the ranges mentioned above.

Illumination lamp facilities as preferably used for the plant cultivation are equipped with a control part. Emission intensities of red light, blue light and far-red light, emitted from the irradiation part 11, can be controlled by varying the current value, applied to the red light emitting elements 2, blue light emitting elements 3 and the far-red light, by the controlling part.

The illumination lamp facility equipped with the control part in the irradiation part having red light emitting elements, blue light emitting elements and far-red light emitting elements is also advantageous as compared with the conventional illumination lamp facility having red light emitting means, blue light emitting means and far-red light emitting means which are separately arranged, because the light control part can be easily and steadily arranged in the illumination lamp facility and undesirable deviation of the irradiation directions of red light, blue light and far-red light can be minimized.

The plant cultivating illumination lamp 1 as illustrated in FIG. 1 is provided with an electrode 41 for red light emitting elements 2, an electrode 42 for blue light emitting elements 3, and an electrode 43 for far-red light emitting elements 4, and further with a grand electrode 44 common for the red light, blue light and far-red light emitting elements. The plural red light emitting elements 2 are electrically connected by wires (not shown) to the electrode 41 for red light emitting elements 2. The plural blue light emitting elements 3 are electrically connected by wires (not shown) to the electrode 42 for blue light emitting elements 3. The plural far-red light emitting elements 4 are electrically connected by wires (not shown) to the electrode 43 for far-red light emitting elements 3.

The control part equipped in the illumination lamp facility 1 has a function of independently turning on and off the red light emitting elements 2, the blue light emitting elements 3 and the far-red light emitting elements 4 by supplying electric current, respectively, via the electrode 41 and the grand electrode 44 to the red light emitting elements 2, via the electrode 42 and the grand electrode 44 to the blue light emitting elements 3, and via the electrode 43 and the grand electrode 44 to the far-red light emitting elements 4.

The control part is provided with a lamp controller (i.e., light emission intensity-controlling means), which can turn on and off the red light emitting elements 2, the blue light emitting elements 3 and the far-red light emitting elements 4 so that the red light, the blue light and the far-red light are irradiated alternately or concurrently, and for a desired period of time. Thus, the light emission intensity ratios of red light, blue light and far-red light, irradiated from the light irradiation part 11, can be appropriately controlled so as to achieve the desired growth of plants.

Plant Cultivation Method

The method of cultivating a plant according to the present invention will now be explained specifically and more in detail on an embodiment using the illumination lamp 1 as illustrated in FIG. 1.

The plant cultivation method of the present invention comprises a red light irradiation step (A), a blue light irradiation step (B) and a far-red light irradiation step (C) which are independently carried out for a predetermined period of time.

By the term "predetermined period of time" as used herein, we mean an optional length of time within the course of plant cultivation. The maximum length of the predetermined period of time equals to the entire time length of the course of plant cultivation. The minimum length thereof can be voluntarily set provided that the desired plant growth-enhancing effect can be attained. The predetermined period of time can be expressed in unit of hour, day or minute depending upon the particular length of time.

Each of the red light irradiation step (A), the blue light irradiation step (B) and the far-red light irradiation step (C) is carried out independently for the predetermined period of time, and at least once, preferably at least two times, in the course of cultivation.

In the case when the red light irradiation step (A), the blue light irradiation step (B) and the far-red light irradiation step (C) are carried out dividedly in two times or more, time lengths of each operation of the step (A), each operation of the step (B), and each operation of the step (C) are preferably at least 1 hour, more preferably in the range of 1 to 48 hours, and especially preferably in the range of 3 to 24 hours.

By the term "independently" as used herein, we mean that the red light irradiation step (A), the blue light irradiation step (B) and the far-red light irradiation step (C) exist separately in the course of plant cultivation.

The procedure of independently carrying out the red light irradiation step (A) and the blue light irradiation step (B) gives a desired plant growth effect, as compared with a plant cultivation procedure wherein red light and blue light are concurrently irradiated. The reason for which the desired enhanced plant growth can be attained by independently carrying out the red light irradiation step (A) and the blue light irradiation step (B), is not clear. But, it is presumed that the photosynthesis process caused by the red light is different from that caused by the blue light due to the fact that chlorophyll exhibits a red light absorption peak distinct from a blue light absorption peak, therefore, when light and blue light are concurrently irradiated, the photosynthesis process by red light and the photosynthesis process by blue light undesirably interfere with each other.

Alternate flashing of red light irradiation and blue light irradiation by quickly repeating light flashing with a high frequency such as 1 Hz or higher is excluded from the light irradiation procedure adopted for independently carrying out the red light irradiation step (A), the blue light irradiation step (B) and the far-red light irradiation step (C) for a predetermined period of time in the plant cultivation method according to the present invention.

In the alternate flashing of red light irradiation and blue light irradiation by quickly repeating light flashing with a high frequency such as 1 Hz or higher, the photosynthesis reaction and related reactions do not occur to the desired extent. This is because each flashing of red light irradiation and blue light irradiation occurs for a very short length of time which is insufficient for performing photosynthesis reaction and related reactions for achieving the plant growth effect. The plant growth effect achieved by the quick alternate flashing is similar to that achieved by the operation of concurrently irradiating plant with red light and blue light.

The red light irradiation step (A), the blue light irradiation step (B) and the far-red light irradiation step (C) can be carried out either alternately and continuously, or intermittently or discontinuously with interposition of a pause of irradiation between each operation of the red light irradiation step (A), each operation of the blue light irradiation step (B) and each operation of the far-red light irradiation step (C).

The order of the red light irradiation step (A), the blue light irradiation step (B) and the far-red light irradiation step (C) are optional and not limited. For example, the order of the step (A), the step (C) and the step (B) can be adopted.

The period of time for irradiation at the step (C) is preferably approximately equal to or shorter than those for irradiation at the step (A) and the step (B). More preferably, the period of time for irradiation at the step (C) is in the range of 10% to 50% of the period of time for irradiation at the shorter one of the step (A) and the step (B).

The plant cultivation method of the present invention can be adopted for any period of time within the entire course of plant cultivation spanning from immediately after the germination of seeds or immediately after the plantation to the harvest.

The plants to be cultivated in the method of the present invention are not particularly limited, and this term means plants in a broad sense which include leaf plants, water plants, root plants, fruit plants, pluses, grains, seeds, algae, house plants, mosses and vegetable planktons.

In the cultivation of leaf vegetables, importance lies not only in promotion of growth of leaves by photosynthesis, but also in translocation of sugars, produced by photosynthesis, to fruits and roots. Additional irradiation of far-red light according to the present invention is believed to enhance the growth promotion and translocation of sugars.

EXAMPLES

Preparation of Plants to be Tested

In the following examples, reference example and comparative example, strawberries were cultivated and tested for evaluation of the growth state.

Ten seedlings of strawberries were planted at equal intervals in a cultivation bed for hydroponic culture, to which an aqueous nutritious liquid was supplied.

Example 1

The raised seedlings of strawberry for test were set in a cultivation bed placed in an environment-controlled hydroponic culture room wherein temperature and humidity were maintained at 18 to 22° C. and 60%, respectively, and carbon dioxide concentration was controlled to 1,000 ppm. A commercially available nutritious liquid was supplied under standard conditions. The hydroponic bed was provided with a fluorescent LED lamp. The strawberries were irradiated with lights under the following conditions.

The fluorescent LED lamp used had a light emitting part provided with 240 red light emitting elements, 120 blue light emitting elements, and 40 far-red light emitting elements. The red light emitting elements emitted red light having a center emission wavelength of approximately 660 nm and a wavelength region of 640-680 nm, the blue light emitting elements emitted blue light having a center emission wavelength of approximately 450 nm and a wavelength region of 430-470 nm, and the far-red light emitting elements emitted far-red light having a center emission wavelength of approximately 735 nm and a wavelength region of 720-750 nm.

The fluorescent LED lamp used further had a light control part capable of independently turning on and off the red light emitting elements, the blue light emitting elements and the far-red light emitting elements. The emission intensities of the light emitting elements were adjusted so that all of the emission intensities of the three kinds of lights were approximately the same.

The red light emitting elements exhibited a total emission intensity, i.e., a total photosynthetic photon flux density (PPFD), of 240 μmol/m$^2$·s. The blue light emitting elements exhibited a total PPFD of 120 μmol/m$^2$·s. The far-red light emitting elements exhibited a total PPFD of 40 μmol/m$^2$·s. Thus, the total emission intensity ratio of red light, blue light and far-red light was 6:3:1.

The red light irradiation step and the blue light irradiation step were alternately and repeatedly carried out for 10 hours for each irradiation time per day, i.e., each light irradiation step was carried out separately and continuously over a period of 10 hours per day. The far-red light irradiation step was carried out for 4 hours for each irradiation time per day, i.e., each far-red light irradiation step was carried out separately and continuously over a period of 4 hours per day. The order of irradiation was (1) red light, (2) far-red light and (3) blue light. There was no time for which the light irradiation was ceased.

When 150 days elapsed, the light irradiation was stopped and grown strawberries were harvested.

The cultivation results are shown in Table 1, below. The days spanning from the start of culture under irradiation to the day on which most strawberries bloomed were observed and expressed as "days to blooming" in Table 1. The total weight of strawberry fruits collected for 120 days growth duration and for 150 days growth duration were measured, and was expressed by average yield (g) per each strawberry.

emission intensities of red light, blue light and far-red light were 240 μmol/m$^2$·s as total photosynthetic photon flux density (PPFD). All other cultivation conditions remained substantially the same as in Example 1. The cultivation results are shown in Table 1.

Reference Example 1

By the same procedures as described in Example 1, strawberries were cultivated except that far-red light was not irradiated. That is, the red light irradiation step and the blue light irradiation step were alternately and repeatedly carried out for 10 hours for each irradiation time per day, i.e., each light irradiation step was carried out separately and continuously over a period of 10 hours per day. Non-irradiation time of 4 hours per day was provided. The order of irradiation was (1) red light, (2) blue light, and (3) non-irradiation. All other cultivation conditions remained substantially the same as in Example 1. The cultivation results are shown in Table 1.

Comparative Example 1

By the same procedures as described in Example 1, strawberries were cultivated except that the red light irradiation step, the blue light irradiation step and the far-red light irradiation step were concurrently and continuously carried out for 16 hours per day; and the lamp was left put out for 8 hours per day. All other cultivation conditions remained substantially the same as in Example 1. The cultivation results are shown in Table 1.

As seen from Table 1, in Examples 1 to 3, the growth of strawberries was promoted markedly, and thus, the days to blooming was short, and harvest of strawberry fruits was almost completed when 120 days elapsed. In Example 3, the growth of strawberries was promoted most markedly, but,

TABLE 1

| Examples, Comparative Examples | Irradiation time (hours per day) | Cultivation results | | |
|---|---|---|---|---|
| | | Days to blooming (days) | Yield of berry | |
| | | | 120 days growth duration | 150 days growth duration |
| Ex. 1 | Red 10 h → FR 4 h → Blue 10 h | 39 | 610 | 640 |
| Ex. 2 | Red 10 h → Blue 10 h → FR 4 h | 40 | 590 | 660 |
| Ex. 3 | Red 10 h → FR 4 h → Blue 10 h | 42 | 510 | 590 |
| Ref. Ex. 1 | Red 10 h → Blue 10 h → Non-irradiation 4 h | 46 | 430 | 580 |
| Co. Ex. 1 | (Red + Blue + FR) 16 h → Non-irradiation 8 h | 55 | 190 | 430 |

Note;
FR: Far-red light

Example 2

By the same procedures as described in Example 1, strawberries were cultivated except that the order of irradiation was changed to (1) red light, (2) blue light, and (3) far-red light. All other cultivation conditions remained substantially the same as in Example 1. The cultivation results are shown in Table 1.

Example 3

By the same procedures as described in Example 1, strawberries were cultivated except that all of the total consumption of electric current was large and thus somewhat costly, as compared with Examples 1 and 2.

In Reference Example 1, the days to blooming were long and approximately 150 days were required for harvest, and the total weight of strawberry fruits was relatively small. In Comparative Example 1, the rate of growth was slow and the total weight of strawberry fruits after the 150 days duration was very small.

The invention claimed is:
1. A method of cultivating a plant comprising a step (A) of irradiating a plant with a red light and a step (B) of irradiating a plant with a blue light, wherein the red light irradiation step (A) and the blue light irradiation step (B) are independently and repeatedly carried out for a predetermined period of time, wherein said method of plant-cultivation further comprises a step (C) of irradiating a plant with a light predominantly comprised of a far-red light, separately from the red light irradiation step (A) and the blue light irradiation step (B), and wherein the irradiation time of the far-red light step is 4 hours or more and the irradiation time of each of the red light step and the blue light step is greater than the irradiation time of the far-red light step.

2. The method of cultivating a plant according to claim 1, wherein the light irradiated at the far-red light irradiation step (C) has at least 60%, based on the total emission intensity of the light, of an emission intensity ratio of far-red light.

3. The method of cultivating a plant according to claim 1, wherein the light irradiated at the red light irradiation step (A) has at least 60%, based on the total emission intensity of said light irradiated at the step (A), of an emission intensity ratio of red light.

4. The method of cultivating a plant according to claim 1, wherein the light irradiated at the blue light irradiation step (B) has at least 60%, based on the total emission intensity of said light irradiated at the step (B), of an emission intensity ratio of blue light.

5. The method of cultivating a plant according to claim 1, wherein the far-red light has a center wavelength in the range of 720 nm to 780 nm, the red light has a center wavelength in the range of 620 nm to 700 nm, and the blue light has a center wavelength in the range of 400 nm to 480 nm.

6. The method of cultivating a plant according to claim 1, wherein the red light is irradiated by using a semiconductor light emitting element having an AlGaInP light emitting layer, the blue light is irradiated by using a semiconductor light emitting element having a GaInN light emitting layer, and the far-red light is irradiated by using a semiconductor light emitting element having an AlGaAs light emitting layer.

7. The method of cultivating a plant according to claim 1, wherein the red light irradiation step (A), the blue light irradiation step (B) and the far-red light irradiation step (C) are alternately and repeatedly carried, and each of the red light irradiation step (A), the blue light irradiation step (B), and the far-red light irradiation step (C) is carried out over a period of at least one hour for each irradiation time.

8. The method of cultivating a plant according to claim 1, wherein the red light irradiation step (A), the blue light irradiation step (B) and the far-red light irradiation step (C) are carried out using an illumination lamp facility having red light emitting elements, blue light emitting elements and far-red light emitting elements, which are capable of being independently operated, and wherein a ratio of the total emission intensity of red light to the total emission intensity of blue light is in the range of 1:1 to 9:1, and a ratio of the total emission intensity of blue light to the total emission intensity of far-red light is in the range of 1:1 to 9:1.

* * * * *